United States Patent
Gonsalves et al.

(10) Patent No.: US 9,883,451 B2
(45) Date of Patent: Jan. 30, 2018

(54) DETECTION TECHNIQUES FOR HIGH GAIN MOBILE DEVICES

(71) Applicant: QUALCOMM Incorporated, San Diego, CA (US)

(72) Inventors: Ray Francis Gonsalves, San Diego, CA (US); Madhusudan Kinthada Venkata, San Diego, CA (US); Sunanda Mukundan, San Diego, CA (US); Arvind Vardarajan Santhanam, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 14/847,781

(22) Filed: Sep. 8, 2015

(65) Prior Publication Data
US 2016/0337957 A1 Nov. 17, 2016

Related U.S. Application Data

(60) Provisional application No. 62/161,342, filed on May 14, 2015.

(51) Int. Cl.
*H04W 48/18* (2009.01)
*H04W 48/20* (2009.01)
(Continued)

(52) U.S. Cl.
CPC .............. *H04W 48/18* (2013.01); *H04L 43/16* (2013.01); *H04W 8/24* (2013.01); *H04W 48/20* (2013.01);
(Continued)

(58) Field of Classification Search
CPC . H04W 24/04; H04W 36/0088; H04W 36/30; H04W 52/04; H04W 52/146;
(Continued)

(56) References Cited

U.S. PATENT DOCUMENTS 5,170,392 A * 12/1992 Riordan ................. H04B 1/109
370/252
8,416,745 B2    4/2013 Julian et al.
(Continued)

FOREIGN PATENT DOCUMENTS

WO    WO-9850909 A1    11/1998
WO    WO-2014181441 A1    11/2014
(Continued)

OTHER PUBLICATIONS

3GPP TS 25.304: "3rd Generation Project, Technical Specification Group Radio Access Network, User Equipment (UE) Procedures in Idle Mode and Procedures for Cell Reselection in Connected Mode", 3GPP TS 25.304 V5.4.0, Jun. 1, 2003 (Jun. 1, 2003), 28 Pages, XP002307036, the whole document.
(Continued)

*Primary Examiner* — Nizar Sivji
(74) *Attorney, Agent, or Firm* — Loza & Loza, LLP

(57) ABSTRACT

In various aspects, the disclosure provides for cell selection including determining a gain of an antenna associated with a user equipment (UE), adding an offset to a threshold to yield a power threshold, wherein the offset is based on the gain of the antenna, selecting a wireless network, obtaining a power measurement associated with a cell within the selected wireless network, and comparing the power measurement with the power threshold to yield a comparison.

28 Claims, 7 Drawing Sheets

(51) Int. Cl.
*H04L 12/26* (2006.01)
*H04W 8/24* (2009.01)
*H04W 60/00* (2009.01)
*H04W 36/30* (2009.01)
*H04W 84/04* (2009.01)

(52) U.S. Cl.
CPC ............ *H04W 60/00* (2013.01); *H04W 36/30* (2013.01); *H04W 84/042* (2013.01)

(58) Field of Classification Search
CPC . H04W 52/16; H04W 52/286; H04W 52/365; H04W 52/367; H04W 52/58; H04W 88/06
See application file for complete search history.

(56) References Cited

U.S. PATENT DOCUMENTS

| | | | |
|---|---|---|---|
| 2005/0170867 A1 | 8/2005 | Grant et al. | |
| 2010/0022242 A1* | 1/2010 | Nizri | H04W 60/04 455/435.2 |
| 2011/0026420 A1* | 2/2011 | Zhang | H04L 1/0001 370/252 |
| 2011/0280138 A1* | 11/2011 | Terry | H04B 7/15535 370/252 |
| 2012/0146774 A1* | 6/2012 | Kasai | G06K 7/0008 340/10.42 |
| 2012/0188884 A1 | 7/2012 | Simonsson et al. | |
| 2012/0257568 A1* | 10/2012 | Cai | H04L 1/1614 370/328 |
| 2012/0322397 A1* | 12/2012 | Jin | H03G 3/3052 455/234.2 |
| 2013/0130682 A1 | 5/2013 | Awad et al. | |
| 2013/0148611 A1* | 6/2013 | Moulsley | H04B 7/024 370/329 |
| 2013/0242755 A1* | 9/2013 | Seki | H04L 1/0006 370/242 |
| 2015/0230190 A1* | 8/2015 | Shin | H04B 7/0689 370/329 |
| 2016/0050050 A1* | 2/2016 | Kang | H04B 7/0617 370/329 |

FOREIGN PATENT DOCUMENTS

| | | |
|---|---|---|
| WO | WO-2015010287 A1 | 1/2015 |
| WO | WO-2015014391 A1 | 2/2015 |

OTHER PUBLICATIONS

International Search Report and Written Opinion—PCT/US2016/027555—ISA/EPO—dated Jun. 21, 2016.

\* cited by examiner

DETECTION TECHNIQUES FOR HIGH GAIN MOBILE DEVICES

CLAIM OF PRIORITY UNDER 35 U.S.C. §119

The present Application for Patent claims priority to Provisional Application No. 62/161,342 entitled "DETECTION TECHNIQUES FOR HIGH GAIN MOBILE DEVICES" filed May 14, 2015, and assigned to the assignee hereof and hereby expressly incorporated by reference herein.

TECHNICAL FIELD

Aspects of the present disclosure relate generally to wireless communication systems, and more particularly, to cell selection processes in wireless communication systems.

INTRODUCTION

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks. Evolved UTRA (eUTRA) is a fourth generation (4G) technology, sometimes called long-term evolution (LTE), and is the technological successor to 3G UMTS.

In the 3GPP standard, after a public land mobile network (PLMN) has been selected, the mobile device attempts to find a suitable cell to camp on. (See 3GPP TS 25.304). Certain suitability criteria, or S criteria (see, for example, 3GPP TS 25.304 Section 5.2.3.1.2) are evaluated to determine if a cell is suitable to camp on during the initial cell selection/reselection procedure. The values of relevant parameters for evaluating the S criteria are signaled through System Information Blocks (SIB) carried on a broadcast channel, and these S criteria are then used to determine whether a cell is suitable or unsuitable to camp on.

As the demand for mobile broadband access continues to increase, research and development continue to advance wireless technologies not only to meet the growing demand for mobile broadband access, but to advance and enhance the user experience with mobile communications.

SUMMARY

The following presents a simplified summary of some aspects of the disclosure in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

Aspects of the disclosure are directed to cell selection. According to various aspects, disclosed is a method of cell selection including determining a gain of an antenna associated with a user equipment (UE); adding an offset to a threshold to yield a power threshold, wherein the offset is based on the gain of the antenna; selecting a wireless network; obtaining a power measurement associated with a cell within the selected wireless network; and comparing the power measurement with the power threshold to yield a comparison. In various examples, the method may further include selecting the cell as a suitable cell, wherein the comparison indicates that the power measurement is greater than the power threshold; registering a location of the UE with the suitable cell; obtaining a network identifier of the selected wireless network; and/or obtaining a cell identifier of the suitable cell, wherein the UE stores a plurality of network identifiers associated with its Home public land mobile network (HPLMN) and stores a plurality of cell identifiers associated with cells in its HPLMN in one or more databases.

According to various aspects, disclosed is an apparatus of cell selection including a processor for determining a gain of an antenna associated with a user equipment (UE) and for selecting a wireless network; a receiver coupled to the processor for adding an offset to a threshold to yield a power threshold, wherein the offset is based on the gain of the antenna; and a power detector coupled to the receiver for obtaining a power measurement associated with a cell within the selected wireless network; and for comparing the power measurement with the power threshold to yield a comparison. In various examples, the processor may be further configured for selecting the cell as a suitable cell, wherein the comparison indicates that the power measurement is greater than the power threshold; the processor may be further configured for registering a location of the UE with the suitable cell; and/or the processor may be further configured for obtaining a network identifier of the selected wireless network and for obtaining a cell identifier of the suitable cell. In various examples, the apparatus may further include a memory coupled to the processor for storing a plurality of network identifiers associated with the UE's Home public land mobile network (HPLMN) and a plurality of cell identifiers associated with cells in the UE's HPLMN.

According to various aspects, disclosed is an apparatus of cell selection including means for determining a gain of an antenna associated with a user equipment (UE); means for adding an offset to a threshold to yield a power threshold, wherein the offset is based on the gain of the antenna; means for selecting a wireless network; means for obtaining a power measurement associated with a cell within the selected wireless network; and means for comparing the power measurement with the power threshold to yield a comparison. In various examples, the apparatus may further include means for selecting the cell as a suitable cell, wherein the comparison indicates that the power measurement is greater than the power threshold; means for registering a location of the UE with the suitable cell; means for obtaining a network identifier of the selected wireless network; means for obtaining a cell identifier of the suitable cell; and/or means for storing a plurality of network identifiers associated with the UE's Home public land mobile network (HPLMN) and a plurality of cell identifiers associated with cells in the UE's HPLMN.

According to various aspects, disclosed is a computer-readable storage medium storing computer executable code, operable on a device including at least one processor; a memory for storing one or more of a network identifier or a cell identifier, the memory coupled to the at least one processor; and the computer executable code including instructions for causing the at least one processor to determine a gain of an antenna associated with a user equipment (UE); instructions for causing the at least one processor to add an offset to a threshold to yield a power threshold, wherein the offset is based on the gain of the antenna; instructions for causing the at least one processor to select a wireless network; instructions for causing the at least one processor to obtain a power measurement associated with a cell within the selected wireless network; and instructions for causing the at least one processor to compare the power measurement with the power threshold to yield a comparison. In various examples, the computer executable code may further include instructions for causing the at least one processor to select the cell as a suitable cell, wherein the comparison indicates that the power measurement is greater than the power threshold; instructions for causing the at least one processor to register a location of the UE with the suitable cell; and/or instructions for causing the at least one processor to obtain one or more of the network identifier or the cell identifier, wherein the network identifier is of the selected wireless network and the cell identifier is of the suitable cell.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure are directed to an apparatus and method for initial cell selection of a mobile terminal. The methods and processes disclosed herein are applicable to all radio access technologies (RATs) that use S criteria to determine the suitability of a cell. Examples of the applicable RATs may include, but not limited to, GSM, UMTS, and LTE. More specifically, various aspects of the disclosure enable a UE to modify S criteria depending on the UE antenna gain.

Figure 1:
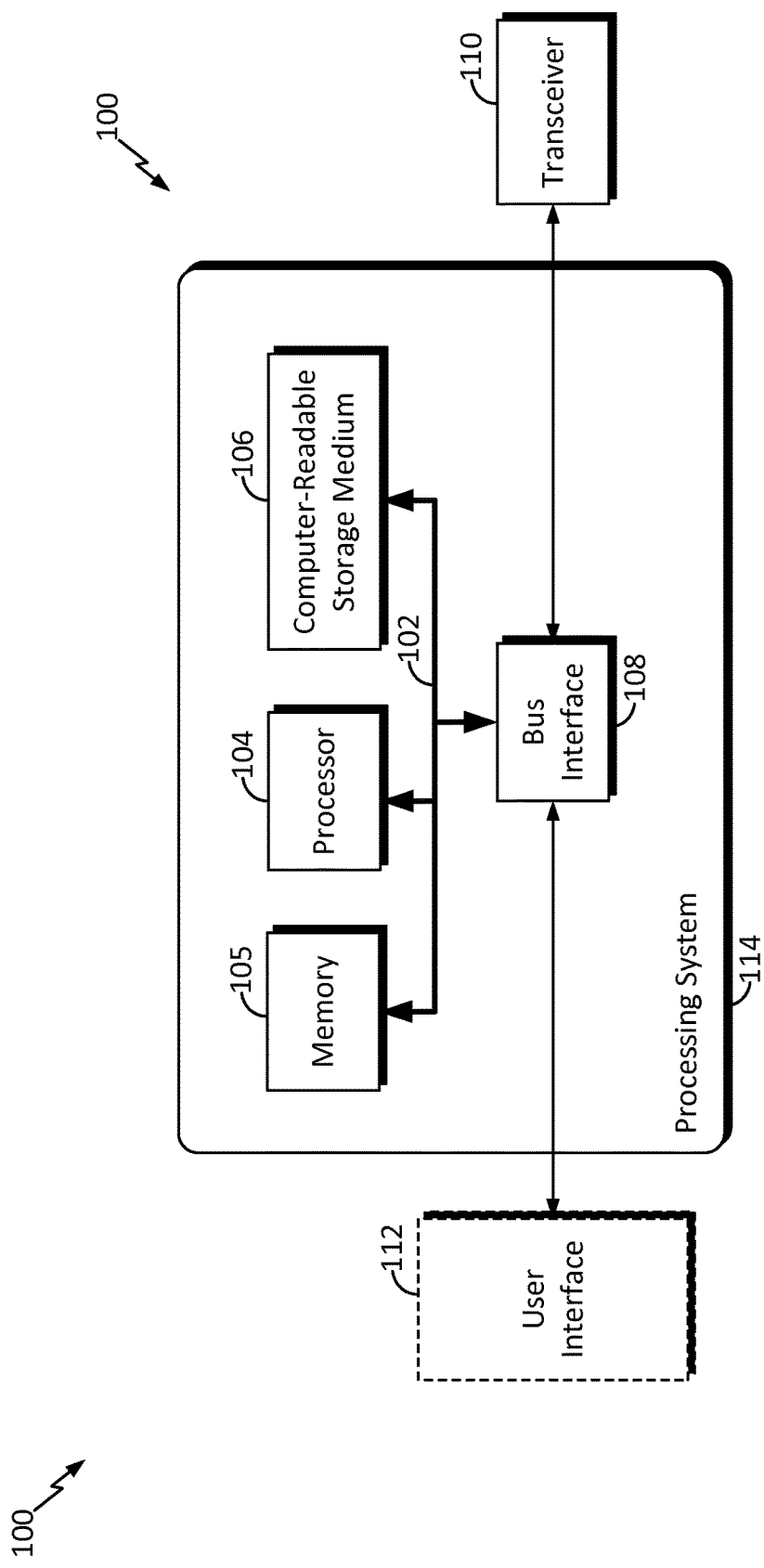
FIG. 1 is a conceptual diagram illustrating an example of a hardware implementation for an apparatus employing a processing system in accordance with aspects of the present disclosure.
Figure 2:
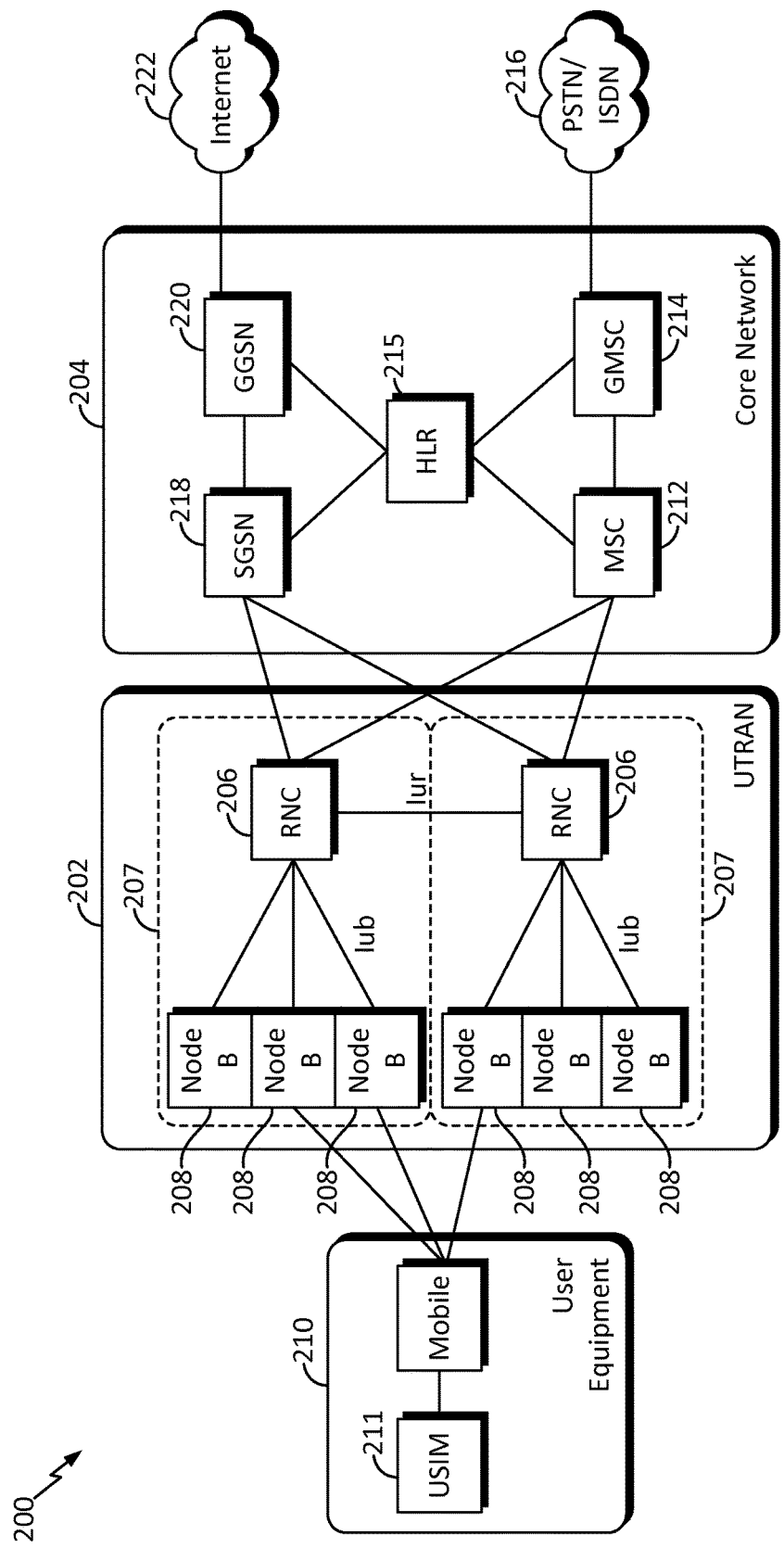
FIG. 2 is a conceptual diagram illustrating an example of a Universal Mobile Telecommunications System (UMTS) telecommunications system in accordance with aspects of the present disclosure.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. For example, the apparatus 100 may be a user equipment (UE) as illustrated in any one or more of FIGS. 2 and/or 3. In another example, the apparatus 100 may be a radio network controller (RNC) as illustrated in FIG. 2. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 104, as utilized in an apparatus 100, may be used to implement any one or more of the processes described below and illustrated in FIG. 6.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable storage medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick, touchscreen, and touchpad) may also be provided.

The processor 104 may, in one or more examples, include cell selection circuitry configured for various functions, including, for example, determination whether or not a cell is suitable to camp on. For example, the cell selection circuitry may be configured to implement one or more of the functions described below in relation to FIG. 6.

The computer-readable storage medium 106 may be configured to operate in tandem with the processor 104 for carrying out the functions throughout this disclosure. In one or more examples, the computer-readable storage medium 106 may include various routines when executed configure the processor 104 to perform the various functions described in relation to FIG. 6 below.

The processor 104 is responsible for managing the bus 102 and general processing, including the execution of software stored on the computer-readable storage medium 106. The software, when executed by the processor 104, causes the processing system 114 to perform the various functions described below for any particular apparatus. The computer-readable storage medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 106. The computer-readable storage medium 106 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 106 may reside in the processing system 114, external to the processing system 114, or be distributed across multiple entities including the processing system 114. The computer-readable storage medium 106 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

The various concepts presented throughout this disclosure may be implemented across a broad variety of telecommunication systems, network architectures, and communication standards. FIG. 2 is a conceptual diagram illustrating an example of a Universal Mobile Telecommunications System (UMTS) telecommunications system 200 in accordance with aspects of the present disclosure. Referring now to FIG. 2, as an illustrative example without limitation, a UMTS network may include three interacting domains: a core network 204, a radio access network (RAN) (e.g., the UMTS Terrestrial Radio Access Network (UTRAN) 202), and a user equipment (UE) 210. Among several options available for a UTRAN 202, in this example, the illustrated UTRAN 202 may employ a W-CDMA air interface for enabling various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring, and releasing radio resources within the RNS 207. The RNC 206 may be interconnected to other RNCs (not shown) in the UTRAN 202 through various types of interfaces such as a direct physical connection, a virtual network, or the like using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network 204 for any number of mobile apparatuses.

Examples of a mobile apparatus may include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

In a UMTS system, the UE 210 may further include a universal subscriber identity module (USIM) 211, which may contain a user's subscription information to a network. For illustrative purposes, one UE 210 is shown in communication with a number of the Node Bs 208. The downlink (DL), also called the forward link, refers to the communication link from a Node B 208 to a UE 210 and the uplink (UL), also called the reverse link, refers to the communication link from a UE 210 to a Node B 208. Also shown in FIG. 2 is an internal interface Iub between the RNC 206 and the Node B 208 (which is also referred to as a base station 208). FIG. 2 also shows another internal interface Iur between the two RNCs 206.

The core network 204 may interface with one or more radio access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated core network 204 (e.g., UMTS core network) may include a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 204 supports circuit-switched services with a Mobile services Switching Centre (MSC) 212 and a Gateway MSC (GMSC) 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 may also include a visitor location register (VLR) that contains subscriber-related information for the duration that a UE is in the coverage area of the MSC 212. The GMSC 214 provides a gateway through the MSC 212 for the UE to access a circuit-switched network 216. An example of a circuit switched network is a public switchable telephony network (PSTN) or an integrated services data network (ISDN). Thus, FIG. 2 shows the circuit switched network 216 as 'PSTN/ISDN". The GMSC 214 includes a home location register (HLR) 215 containing subscriber data, such as the data reflecting the details of the services to which a particular user has subscribed. The HLR may also be associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-switched data services with a Serving GPRS Support Node (SGSN) 218 and a Gateway GPRS Support Node (GGSN) 220. General Packet Radio Service (GPRS) is designed to provide packet-data services at speeds higher than those available with standard circuit-switched data services. The GGSN 220 provides a connection for the UTRAN 202 to a packet-based network 222. One example of a packet-based network is the Internet. Thus, FIG. 2 shows the packet-based network 222 as an "Internet". In various examples, the packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UTRAN 202 is one example of a RAN that may be utilized in accordance with the present disclosure. However, the present disclosure is not limited to UMTS W-CDMA/HSPA system. In other aspects of the disclosure, the various functions described in relation to FIG. 6 below may be applicable in, for example, a GSM system, or an LTE system.

Figure 3:
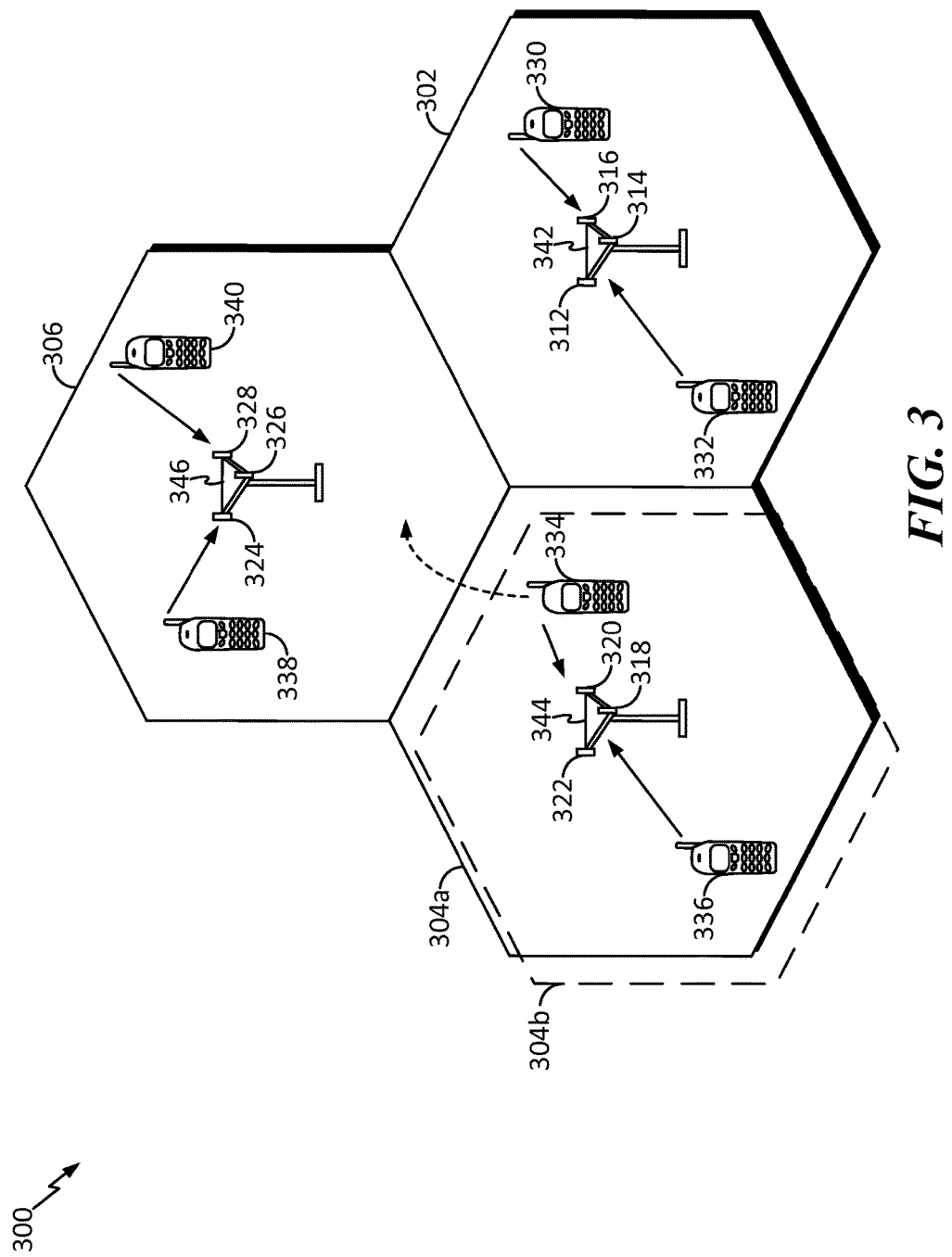
FIG. 3 is a conceptual diagram illustrating an example of a wireless system in accordance with aspects of the present disclosure.

FIG. 3 is a conceptual diagram illustrating an example of a wireless system in accordance with aspects of the present disclosure. Referring to FIG. 3, by way of example and without limitation, a simplified schematic illustration of a RAN 300 in a UTRAN architecture is illustrated. The system includes multiple cellular regions (cells), including cells 302, 304, and 306, each of which may include one or more sectors. Cells may be defined geographically (e.g., by coverage area) and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304a may utilize a first scrambling code, and cell 304b, while in the same geographic region and served by the same Node B 344, may be distinguished by utilizing a second scrambling code.

In a cell that is divided into sectors, the multiple sectors within a cell may be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 may each correspond to a different sector. In cell 306, antenna groups 324, 326, and 328 may each correspond to a different sector.

The cells 302, 304, and 306 may include several UEs that may be in communication with one or more sectors of each cell 302, 304, or 306. For example, UEs 330 and 332 may be in communication with Node B 342, UEs 334 and 336 may be in communication with Node B 344, and UEs 338 and 340 may be in communication with Node B 346. Here, each Node B 342, 344, and 346 may be configured to provide an access point to a core network 204 (see FIG. 2) for all the UEs 330, 332, 334, 336, 338, and 340 in the respective cells 302, 304, and 306.

During a call with a source cell, or at any other time, the UE 336 may monitor various parameters of the source cell as well as various parameters of neighboring cells. Further, depending on the quality of these parameters, the UE 336 may maintain communication with one or more of the neighboring cells. During this time, the UE 336 may maintain an Active Set. An Active Set is a list of cells to which the UE 336 is simultaneously connected (i.e., the UTRAN cells that are currently assigning a downlink dedicated physical channel DPCH or fractional downlink dedicated physical channel F-DPCH to the UE 336 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 202 is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between the UE 210 and the core network 204 (referring to FIG. 2), and may include circuit switched and packet switched protocols. The AS provides the lower layers, for signaling between the UTRAN 202 and the UE 210, and may include a user plane and a control plane. Here, the user plane or data plane carries user traffic, while the control plane carries control information (i.e., signaling).

Figure 4:
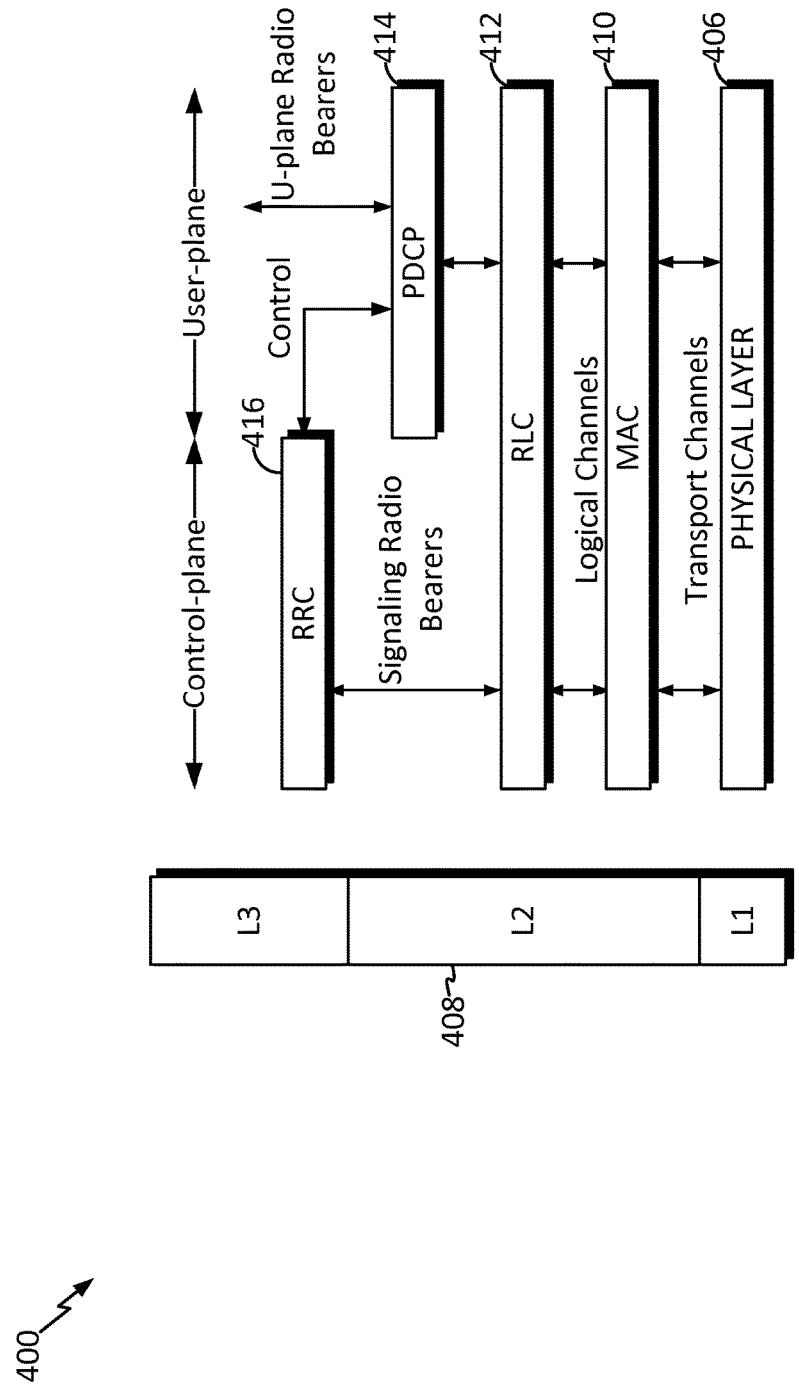
FIG. 4 is a conceptual diagram illustrating an example of a radio protocol architecture for the user and control plane in accordance with aspects of the present disclosure.

FIG. 4 is a conceptual diagram illustrating an example of a radio protocol architecture 400 for the user and control plane in accordance with aspects of the present disclosure. Turning to FIG. 4, the Access Stratum (AS) is shown with three layers: Layer 1 (a.k.a., L1 layer), Layer 2 (a.k.a., L2 layer), and Layer 3 (a.k.a., L3 layer). Layer 1 is the lowest layer and implements various physical layer signal processing functions. Layer 1 will be referred to herein as the physical layer 406. The data link layer, called Layer 2 408, is above the physical layer 406 and is responsible for the link between the UE 210 and Node B 208 over the physical layer 406.

At Layer 3, the RRC layer 416 handles the control plane signaling between the UE 210 and the Node B 208. RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 may provide multiplexing between logical and transport channels. The MAC sublayer 410 may also be responsible for allocating the various radio resources (e.g., resource blocks) in one cell among the UEs. The MAC sublayer 410 is also responsible for HARQ operations.

Figure 5:
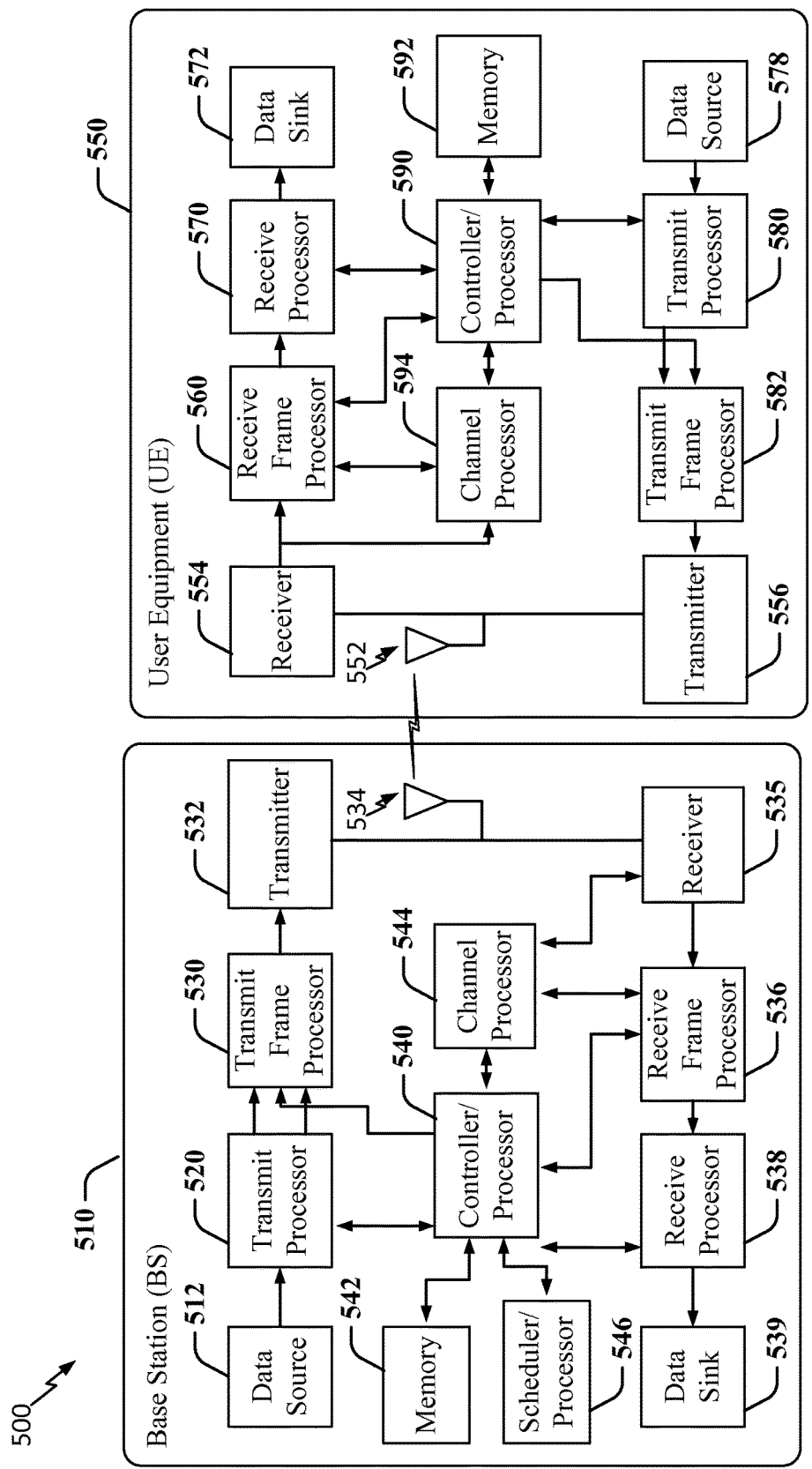
FIG. 5 is a conceptual diagram illustrating an example of a base station and user equipment system in communication with a user equipment (UE) in a networking system in accordance with aspects of the present disclosure.

FIG. 5 is a conceptual diagram illustrating an example of a base station and user equipment system 500 in accordance with aspects of the present disclosure. Illustrated in FIG. 5 is an example of a base station 510 in communication with a UE 550, where the base station 510 may be the base station 208 in FIG. 2, and the UE 550 may be the apparatus 100 (e.g., UE) in FIG. 1 and/or the UE 210 in FIG. 2. Each of the base station 510 and the UE 550 may include one or more processing circuits such as the processing system 114 of FIG. 1. In the downlink communication, a transmit processor 520 of the base station 510 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by the controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the base station 510. More specifically, the receive processor 570 descrambles and despreads the symbols, and then determines the most likely signal constellation points transmitted by the base station 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., a display). Control signals carried by successfully decoded frames are provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 in the UE 550, and control signals from the controller/processor 590 are provided to a transmit processor 580. The data source 578 may represent applications running in the UE 550 and various user interfaces (e.g., keyboard). Similar to the functionality described in connection with the downlink transmission by the base station 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the base station 510 or from feedback contained in a midamble transmitted by the base station 510, may be used to select the appropriate coding, modulation, spreading, and/or scrambling schemes. The symbols produced by the transmit processor 580 may be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the base station 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may use an acknowledgement (ACK) and/or negative acknowledgement (NACK) protocol to support retransmission requests for those frames.

The controller/processors 540 and 590 may be used to direct the operation at the base station 510 and the UE 550, respectively. For example, the controller/processors 540 and 590 may provide various functions including timing, peripheral interfaces, voltage regulation, power management, and other control functions. The computer readable media of memories 542 and 592 may store data and software for the base station 510 and the UE 550, respectively. A scheduler/processor 546 at the base station 510 may be used to allocate resources to UEs and schedule downlink and uplink transmissions for the UEs.

In a wireless telecommunication system, the communication protocol architecture may take on various forms depending on the particular application. For example, in a 3GPP UMTS, the signaling protocol stack is divided into a Non-Access Stratum (NAS) and an Access Stratum (AS). The NAS provides the upper layers for signaling between the UE 210 and the core network 204 (referring to FIG. 2*a*), and may include circuit switched and packet switched protocols. The AS provides the lower layers for signaling between the UTRAN 202 and the UE 210, and may include a user plane and a control plane. Here, the user plane or data plane carries user traffic, while the control plane carries control information (i.e., signaling).

Certain aspects of the present disclosure relate to a UE 550 that is adapted to support communication technologies used for interfacing with other devices that are physically in close proximity to the UE 550. Examples of such communication technologies may be based on wireless technologies including technologies defined in WLAN standards (including the IEEE 802.11 standards for Wi-Fi networks), and wireless personal area network (WPAN) standards.

In various examples, a common telecommunications scenario is a home or workplace network where there are a plurality of UEs with both local area network (LAN) and wide area network (WAN) connections. The LAN may be used to interconnect UEs within a limited geographic area (e.g., home or workplace). The WAN may be used to access external networks or core networks, for example, the Internet. For example, the LAN connection may be implemented using WiFi, based on the IEEE 802.11 protocol standard, which may in turn access an external network, for example, the Internet, via a router. The UEs may also be denoted as LAN clients since these UEs access telecommunication services using a LAN for interconnection. The WAN connection may be implemented using a wireless broadband subscription service such as GSM, UMTS, LTE, cdma1x, cdma2000, etc. A UE having a broadband subscription service means that the UE has access to an external network (e.g., Internet, a public data network or a private data network.) via a service agreement.

In various examples, the WAN connection may be implemented using a variety of wireless technologies including time division multiple access (TDMA), code division multiple access (CDMA), frequency division multiple access (FDMA), orthogonal frequency division multiple access (OFDMA), etc. For example, the UE may be compatible with a plurality of wireless technologies to provide broader WAN access. Or the WAN connection may be implemented using a wired broadband subscription service such as Digital Subscriber Line (DSL), cable, fiber optic, etc.

The wireless or wired broadband subscription service may directly access the external or core network (e.g. Internet). In various examples, only one broadband subscription service for a WAN connection may be active in the home or workplace network even though other WAN connections may be available. Subscription aggregation is defined as the combination of individual broadband subscription services. Subscription aggregation of broadband subscription services in a home or workplace network may be beneficial to improve external network access, for example, Internet access, and to offer increased access throughput to UEs which access the Internet. In some examples, a broadband subscription service may also be known as a backhaul link.

In some instances, high bandwidth demand (i.e., high data throughput requirements) from a single UE may degrade the overall data throughput in a home or workplace network. This throughput degradation may be due to the usage of a single shared broadband subscription service among several UEs.

In a UE, the Access Stratum (AS) may report available public land mobile networks (PLMNs) to the NAS on request from the NAS or autonomously. An available PLMN is a PLMN which may be connected to the UE. On request of the NAS, the AS may perform a search for available PLMNs and report them to NAS. The UE may scan all RF channels in the UTRA bands according to its capabilities to find available PLMNs. On each carrier, the UE searches for the strongest cell and reads its system information, in order to find out which PLMN the cell belongs to. Once the UE has selected a PLMN, the cell selection procedure is performed in order to select a suitable cell of that PLMN to camp on. A suitable cell may be a cell which satisfies a certain suitability criteria, for example, the S criteria. When camped on a cell, the UE regularly searches for a better (i.e., more suitable) cell according to the cell reselection criteria. If a better cell is found, that cell may be selected.

For service, the UE camps on a suitable cell, tune to that cell's control channel(s) so that the UE may receive system information from the PLMN, receive registration area information from the PLMN (e.g., location area and routing area), and may receive other AS and NAS Information. After registered with a cell, the UE may receive paging and notification messages from the PLMN and initiate call setup for outgoing calls or other actions.

For example, a UTRA UE may search for a suitable cell by using the initial cell selection search procedure or stored information cell selection procedure. The initial cell selection procedure requires no prior knowledge of which RF channels are UTRA carriers. The UE scans all RF channels in the UTRA bands according to its capabilities to find a suitable cell. On each carrier, the UE searches for the strongest cell. In various examples, the strongest cell is the cell with the highest power measurement. Once a suitable cell is found, this cell may be selected. The stored information cell selection procedure requires stored information of carrier frequencies and optionally also information on cell parameters, e.g., scrambling codes, from previously received measurement control information elements. Once the UE has found a suitable cell, the UE may select it. If no suitable cell is found, the initial cell selection procedure is used.

In general, the procedure for acquisition and camping on a cell may include slot synchronization, frame synchronization, scrambling code identification, Broadcast Control Channel (BCCH) transmission time interval (TTI) detection, and BCCH information reading and suitability criteria (S criteria) evaluation. An initial cell selection is considered successful if all the steps are successfully passed. Alternatively, a cell selection is considered a failure if any of those steps fails to pass. Once a failure is detected, the UE moves to the next frequency/band/cell and tries to acquire again. In some cases, this procedure will take as long as several minutes, due to a large number of candidate frequency bands and false passes in earlier steps in the procedure.

In the 3GPP standard, the S criteria are evaluated to determine whether or not a cell is suitable to camp on during the initial selection procedure. When a cell is determined being not suitable, the UE will move on to the next candidate cell. In existing 3GPP standards, the S criteria are evaluated and checked after the Master Information Block (MIB) and all necessary System Information Blocks (SIBs) are decoded and parsed. If a cell is determined not suitable to camp on, the UE discards all decoded information, and tries to camp on the next candidate cell, which is returned by previous steps or upper layers.

According to 3GPP TS 25.304, the evaluation of the S criteria by the UE is performed during initial cell selection. In order to compute the S criteria, the UE must first read the values Qqualmin and Qrxlevmin, which are carried by SIB3/4 on the BCCH. Other values utilized for computing the S criteria, including Qqualmeas and Qrxlevmeas, are measured by the UE, and still other values, including Pcompensation, are stored in the UE. Specifically, a cell may be determined to be suitable to camp on under the following conditions:

For FDD cells: $Srxlev > 0$ AND $Squal > 0$.

For TDD cells: $Srxlev > 0$ where $Squal = Qqualmeas - Qqualmin$ $Srxlev = Qrxlevmeas - Qrxlevmin - Pcompensation$ In various examples, the evaluation of the S criteria by the UE during initial cell selection may be modified by incorporation of an antenna gain-dependent offset, $S_{offset}$. In general, an antenna has two complementary characteristics, namely antenna gain and beamwidth (i.e., coverage). As antenna gain increases, beamwidth decreases, i.e., the antenna beam is narrower and coverage is reduced. Typical mobile devices or user equipment (UE) employ a low gain antenna (i.e., with a wide beamwidth or broader coverage). In a cell selection scenario, where the UE attempts to select a base station to camp on (i.e., communicate with), usage of a low gain antenna implies that the UE will predominantly select a nearby base station since a receive downlink signal used for signal acquisition from a nearby base station may be at a relatively higher power level compared to a receive downlink signal from a distant base station.

Also a UE which employs a high gain antenna, for example, a UE in an automobile with a rooftop antenna, may select a distant base station since a receive downlink signal from the distant base station used for signal acquisition may be received by the UE at a signal power level higher than a receive threshold level, due to the high gain antenna. For example, a high gain antenna with a gain of 10 dBi (i.e., ten times greater gain than an isotropic antenna), effectively amplifies a receive downlink signal by a factor of 10. A high gain antenna with a gain of 20 dBi (i.e. one hundred times greater gain than an isotropic antenna) effectively amplifies a receive downlink signal by a factor of 100. Thus, usage of a high gain antenna in a UE may greatly increase the signal power level of a receive downlink signal from the distant base station which may greatly increase the probability of the UE acquiring the distant base station. That is, the S criteria for the distant base station may be satisfied due to the high gain antenna. However, another base station might also be available, for example, a Visitor PLMN (VPLMN), but would not be selected if the distant base station were selected first.

However, in the opposite (uplink) direction, from the UE to the base station, reverse signals (e.g., random access channel, RACH) may not be received successfully at the base station due to the relatively low uplink power of the UE transmitter. In this scenario, there may be repeated call failures while the UE is "latched" on the strong, but distant, receive downlink signal from the distant base station. For example, in a border scenario where the automotive UE is near an international border, the UE may attempt to select a strong, but distant base station receive downlink signal during cell selection, but may have call failures due to the weak uplink (i.e., reverse) signal from the UE.

For example, if the UE has crossed an international border (e.g., from the US to Canada), the UE may acquire a distant base station from its Home PLMN if the UE utilizes a high gain antenna. In some cases, a PLMN throttling and domain selection logic in the UE may assist in steering the UE away from this distant base station. For example, if a circuit switched fallback (CSFB) call undergoes a random access channel (RACH) failure, then the Non-Access Stratum (NAS) portion of the UE may tune the UE to a gateway to place the call. If there is a RACH failure during registration, then the UE may block the PLMN. If there is a RACH failure during a data call, then in that scenario as well the UE may throttle the PLMN. In addition, the radio resource control (RRC) may assist on RACH failures as well.

In various aspects, the present disclosure is directed toward avoiding repeated call failures, for example, in a scenario where the UE employs a high gain antenna. For example, the UE may detect its presence at a border PLMN area. A border PLMN area may be an international border with neighboring PLMNs from at least two different countries (e.g., with different mobile country codes (MCCs)). In various examples, the cell selection procedure is modified on the basis of the UE antenna gain. That is, the modified cell selection procedure differentiates among different classes of UE antennas (i.e., high gain antenna, medium gain antenna, low gain antenna, etc.). The modified cell selection procedure applies an antenna gain-dependent offset, $S_{offset}$, in the S criteria. In other examples, the antenna gain-dependent offset, $S_{offset}$, may be removed if a detection algorithm determines that the UE is not at a border. For example, the modified cell selection procedure may mitigate a ping-pong behavior (i.e., toggling between two states) between PLMNs at a border. In addition, the modified cell selection procedure may facilitate optimal dc power consumption for weak coverage areas.

For example, cell selection may be based on S criteria. S criteria are based on receive power measurements compared to a pre-selected threshold. The receive power measurements may be performed, for example, during idle mode, to yield idle mode measurements.

In various examples, the overall cell selection procedure may be summarized as follows:
1. Select a wireless network (e.g., public land mobile network (PLMN)) either automatically or manually.
2. Select a suitable cell in the selected wireless network based on receive power measurements and cell selection criteria (e.g., S criteria).
3. Register UE location in the selected cell For example, a first cell selection scenario may occur at a border inside a roaming PLMN coverage area. A UE with a high gain antenna may be camped on a Home PLMN (HPLMN) and may be approaching a Visitor PLMN (VPLMN) at the border between the Home PLMN and Visitor PLMN (VPLMN). A Home PLMN (HPLMN) is a PLMN which is a default network for the UE i.e. PLMN where the MCC and MNC of the PLMN identity match the MCC and MNC of the IMSI. A Visitor PLMN (VPLMN) is a PLMN which is not a default network for the UE (i.e. Mobile Country Code/Mobile Network Code (MCC/MNC) of PLMN different from the International Mobile Subscriber Identity (IMSI)).

Within the roaming PLMN coverage area, the UE may camp onto the HPLMN, since the UE has a high gain antenna, even though it may be distant from the HPLMN. The user may initiate a voice or data call, for example, using a RRC connection setup. The UE may check if a number of RACH failures (i.e., uplink failures) equals or exceeds a threshold failure number.

In various examples, the UE may check a database (which may be an internal database) with a list of PLMNs. If the VPLMN the UE is approaching is found on the list, a check is made to determine if the VPLMN is an operator preferred PLMN stored in a subscriber identity module (SIM) card of the UE.

If the VPLMN the UE is approaching is not found on the list, the UE may trigger a search for a roaming PLMN (e.g., via a WCDMA PLMN scan). In various examples, the search is triggered after expiration of a VPLMN scan prohibit timer. The VPLMN scan prohibit timer inhibits a scan for PLMNs (e.g., roaming PLMNs) for a preset time period. A roaming PLMN is a PLMN which is not a Home PLMN. For example, a user who is roaming outside the region of his Home PLMN may encounter a roaming PLMN.

If a roaming PLMN is found, then the UE may apply an offset (e.g., $S_{offset}$) for S criteria evaluation in subsequent cell selection steps. If a roaming PLMN is not found, the UE does not apply an offset (e.g., $S_{offset}$) for S criteria evaluation in subsequent cell selection steps. In addition, the UE may start a VPLMN scan prohibit timer for a preset prohibit time period. For example, the preset prohibit time period may be 30 minutes. The VPLMN scan prohibit timer may be useful to save power in the UE when it is in a weak coverage area. If the UE is still in a HPLMN (i.e., no roaming PLMN has been found), then the UE may not initiate further WCDMA PLMN scans for RACH failures until the VPLMN scan prohibit timer expires. For example, the lack of initiation may avoid continuous WCDMA PLMN scans if the UE is determined not to be in a roaming coverage area.

In various examples, a second cell selection scenario may occur when the UE returns to a HPLMN near the border. In this case, the UE may perform a HPLMN scan upon expiration of a timer. The timer may be a periodic HPLMN scan timer which may be a preset time period in which no scanning may occur. If the UE finds a HPLMN, the UE may camp on the found HPLMN and the UE may remove the offset (e.g., $S_{offset}$).

In various examples, a third cell selection scenario may occur in a weak coverage scenario either in-land or in a VPLMN. In this case, the UE may have no coverage (e.g., the UE may be in a basement of a building with blocked coverage) and no available PLMNs may be found during regular out of service (OOS) scans. In the weak coverage scenario, the UE may remove the offset (e.g., $S_{offset}$).

In various examples, a fourth cell selection scenario may occur when the UE maintains a border PLMN database. The border PLMN database may be used to perform detection of PLMNs near the border by using a fingerprinting technique. In various examples, the border PLMN database includes network parameters which may be: HPLMN identifiers, HPLMN cell identifiers, VPLMN identifiers, and/or VPLMN cell identifiers. The network parameters may be used to identify a PLMN and/or a cell within the PLMN. For example, when the UE is camped on a cell within a HPLMN near the border, the UE may have information on available VPLMN cell identifiers. Depending on a call success rate of the cell within the HPLMN near the border, the UE may move to a cell within a VPLMN near the border to continue service.

In various examples, a fifth cell selection scenario may occur when the UE performs detection of a PLMN near a border with device to device communication. In various examples, some UEs may have more information on PLMNs and/or cells within PLMNs than other UEs. That is, some UEs may have more fingerprinting history than other UEs. In various examples, a fingerprinting history is information on PLMNs and/or cells within the PLMNs.

For example, UEs may communicate directly to each other using device-to-device (D2D) communication. D2D communication may use LTE-Direct (LTE-D), a direct device-to-device wireless technology based on LTE. D2D may exploit communication with the "cloud", where the "cloud" refers to shared network infrastructure which is accessible by several UEs. The D2D communication may be used to exchange information on PLMNs and cells (i.e., fingerprinting history) among a plurality of UEs. For example, a UE may update a fingerprinting database based on D2D communication. Based on the updated fingerprinting database, the UE may switch to the best available PLMN cell.

Figure 6:
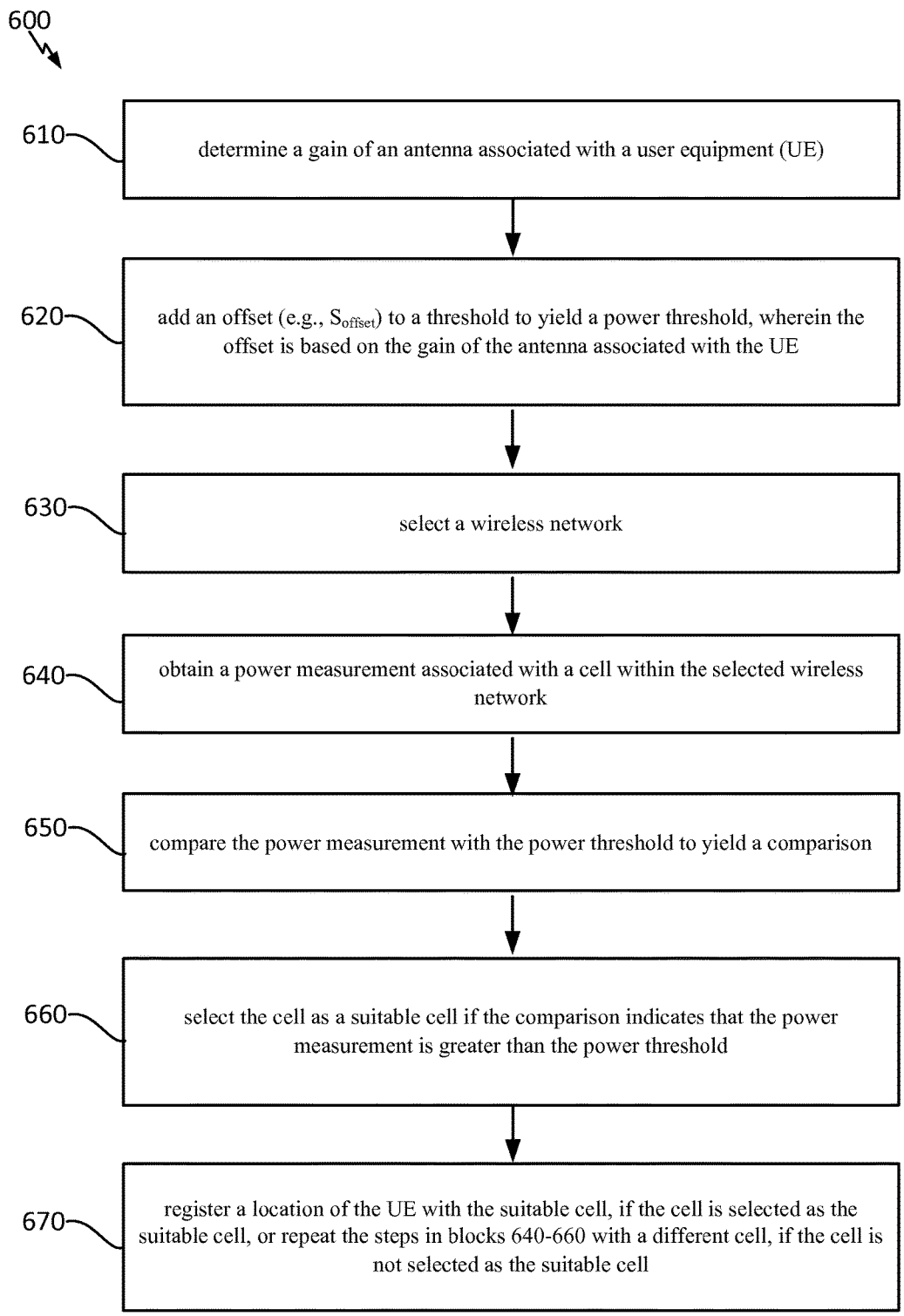
FIG. 6 is a flow chart illustrating a process of cell selection in accordance with aspects of the present disclosure.

FIG. 6 is a flow chart illustrating a process 600 of cell selection in accordance with aspects of the present disclosure. In various examples, the process 600 illustrates a cell selection procedure using S criteria with a power threshold with an offset (e.g., $S_{offset}$) which is dependent on the gain of the UE antenna. The process 600 may be performed at a UE (for example, the apparatus 100 illustrated in FIG. 1), at a UE 210 illustrated in FIG. 2, or at any other suitable apparatus or means for carrying out the described functions.

At block 610, determine a gain of an antenna associated with a user equipment (UE). In various examples, a processor (e.g., processor 104) may be used to determine the gain of the UE antenna. In some examples, a memory (e.g., memory 105) may store one or more gain values and the processor may work in conjunction with the memory to determine the gain of the UE antenna. In some examples, the gain may be a low gain (e.g. gain near 0 dBi). In other examples, the gain may be a high gain (e.g. gain of 10 dBi or higher).

At block 620, add an offset (e.g., $S_{offset}$) to a threshold to yield a power threshold, wherein the offset is based on the gain of the antenna associated with the UE (a.k.a., UE antenna). In various examples, the value of the offset (e.g., $S_{offset}$) may be dependent on the gain of the UE antenna. The offset may also be referred to as an antenna gain dependent offset, $S_{offset}$. In various examples, if the UE employs a high gain antenna, the antenna gain dependent offset, $S_{offset}$, may be a non-zero value. If the UE employs a low gain antenna, the antenna gain dependent offset, $S_{offset}$, may be zero. In some examples, the value of the offset, i.e., the antenna gain dependent offset, $S_{offset}$, may be monotonically related to the gain of the UE antenna. That is, the antenna gain dependent offset, $S_{offset}$, may increase as the UE antenna gain increases. In various examples, a receiver (for example, a receiver within the apparatus 100 (e.g., UE)) or a transceiver (e.g., transceiver 110) may be used to add the offset. In various examples, a power detector may be used to add the offset. The power detector may or may not reside within the receiver.

At block 630, select a wireless network. In some examples, selecting a wireless network may also include initiating a voice call or a data call. For example, the wireless network may be a public land mobile network (PLMN). The PLMN may be a Home PLMN (HPLMN) or may be a Visitor PLMN (VPLMN). That is, the wireless network may be a public land mobile network (PLMN), being either a Home public land mobile network (HPLMN) or a Visitor public land mobile network (VPLMN).

The selection of the wireless network may be made either automatically or manually by a user or operator. For example, the selection of the wireless network may be based on a service agreement. In some examples, a receiver (e.g., transceiver 110) may be used to select the wireless network. In other examples, a processor (e.g., processor 104) may be used to select the wireless network. In various examples, the receiver may work in conjunction with the processor to select the wireless network.

In various examples, the UE may be in a border area and may be approaching a VPLMN. In some examples, the voice or data call initiation may be a Radio Resource Control (RCC) connection setup. In addition, the UE may check if a number of random access channel (RACH) failures equals or exceeds a threshold failure number. For example, the UE may check a database (e.g., an internal database) for a list of any VPLMNs. That is, the UE may check if the VPLMN the UE is approaching is on a list in the database.

If the VPLMN is not found on the list, the UE may trigger a search for roaming PLMNs (e.g., via a WCDMA-PLMN scan). In various examples, the search for the one or more roaming PLMNs is triggered after expiration of a VPLMN scan prohibit timer. In some examples, if the VPLMN is not found on the list, the UE may camp on a Home public land mobile network (HPLMN) and remove the offset that was added to the threshold to yield the power threshold. In various examples, if it is determined that the UE is in a weak coverage area with no available roaming PLMNs, then the offset that was added to the threshold to yield the power threshold may be removed, for example, to increase probability of the UE acquiring a signal from any available cell in any network.

In various examples, if the VPLMN is found on the list, the UE may check if the VPLMN is an operator preferred PLMNs stored in a subscriber identity module (SIM) card of the UE.

In various examples, a border public land mobile network (PLMN) database with at least one network parameter is maintained. The network parameter may be one of: a Home public land mobile network (HPLMN) identifiers, a Home public land mobile network (HPLMN) cell identifiers, a Visitor public land mobile network (VPLMN) identifiers, or a Visitor public land mobile network (VPLMN) cell identifiers. In various examples, the selecting the wireless network is based on the border PLMN database.

At block 640, obtain a power measurement associated with a cell within the selected wireless network. For example, the power measurement may be obtained during idle mode. Idle mode is a UE mode where the UE is powered on, but is not actively transmitting with another user. The power measurement may be associated with a downlink signal, for example, a downlink beacon signal, associated with the cell within the selected wireless network. In various examples, a receiver (for example, a receiver within a user equipment (UE) or a transceiver 110 within the apparatus 100) may be used to obtain the power measurement associated with the cell within the selected wireless network. The receiver may be coupled to an antenna in some examples. In various examples, a power detector may be used to obtain the power measurement associated with the cell within the selected wireless network. The power detector may or may not reside within the receiver. For example, the power measurement may be a receive downlink signal level (e.g., in watts). For example, the power measurement may be a receive flux density (e.g., in watts/square meter).

At block 650, compare the power measurement with the power threshold to yield a comparison. In various examples, the power threshold includes the antenna gain dependent offset, $S_{offset}$. In various examples, a receiver (for example, a receiver within a user equipment (UE) or a transceiver 110 within apparatus 100) may be used to compare the power measurement with the power threshold to yield the comparison. In various examples, a power detector may be used to compare the power measurement with the power threshold to yield the comparison. The power detector may or may not reside within the receiver. And, in other examples, a processor (e.g., processor 104) may be used to compare the power measurement.

At block 660, select the cell as a suitable cell if the comparison indicates that the power measurement is greater than the power threshold. That is, in various examples, the S criteria may be based on the comparison of the power measurement with the power threshold. In various examples, a processor (e.g., processor 104) may be used to select the cell as a suitable cell.

At block 670, register a location of the UE with the suitable cell, if the cell is selected as the suitable cell, or repeat the steps in blocks 640-660 with a different cell, if the cell is not selected as the suitable cell. In various examples, the UE camps on the suitable cell. In various examples, if the cell is not selected as the suitable cell, then the process is repeated (i.e., repeat the steps in blocks 640-660) wherein the UE selects the next candidate cell (i.e., a different cell) for evaluation. The evaluation may include: obtaining a power measurement associated with a different cell within the selected wireless network; comparing the power measurement associated with the different cell with the power threshold to yield a different comparison; and determining if the different comparison indicates that the power measurement associated with the different cell is greater than the power threshold.

In various examples, a processor (e.g., processor 104) may be used to register the location of the UE with the suitable cell. In some examples, the processor may work in conjunction with an antenna to register the location of the UE.

In various aspects, the present disclosure may modify the above procedure at block 630 if a wireless network is not selected. For example, if no roaming VPLMN is found, no offset ($S_{offset}$) is added to the threshold to yield a power threshold. Moreover, if no roaming VPLMN is found, start a VPLMN Scan Prohibit Timer for a prohibit time. The prohibit time may be a preset time, such as but not limited to, 30 minutes. The VPLMN scan prohibit timer defers further wireless network scans until the timer has expired. For example, the usage of the VPLMN scan prohibit timer may avoid continuous wireless network scans if the UE is not in roaming coverage and thus may save UE battery power.

In various aspects, the UE may perform a wireless network scan of its Home public land mobile network (HPLMN) upon expiration of a timer (e.g., a periodic HPLMN scan timer). The periodic HPLMN scan timer may be a preset time period in which no scanning may occur. If the HPLMN is successfully found, the UE may then camp onto the HPLMN and the offset ($S_{offset}$) may be removed from the power threshold. That is, if the HPLMN is found, then camp the UE on the HPLMN and remove the offset that was added to the threshold to yield the power threshold.

In various aspects, if the UE is in a weak coverage area where no available wireless networks (e.g., no available roaming PLMNs) are found during wireless network scans, then the offset ($S_{offset}$) may be removed from the power threshold. That is, if the UE is in a weak coverage area with no available roaming PLMNs, for example, then remove the offset ($S_{offset}$) that was added to the threshold to yield the power threshold.

In various aspects, the present disclosure applies an offset (i.e., an antenna gain dependent offset ($S_{offset}$)) to a power threshold based on the gain of an UE antenna. The value of the applied offset is based on the gain of the UE antenna. For example, a non-zero value offset is applied to the power threshold for a high gain UE antenna and a zero value offset (i.e., no offset) is applied to the power threshold for a low gain UE antenna. In some examples, the value of the offset may be monotonically related to the gain of the UE antenna.

In various aspects, the present disclosure may modify the above procedure at block 630 to obtain a network identifier of the selected wireless network and at block 660 to obtain a cell identifier of the suitable cell. In some examples, the network identifier of the selected wireless network and the cell identifier of the suitable cell may be stored in one or more databases for future use. Also, the UE may store a plurality of network identifiers associated with its Home public land mobile network (HPLMN) and may store a plurality of cell identifiers associated with cells in its HPLMN in one or more databases. In various examples, the network identifier is stored within a memory (e.g., memory 105 or storage 706).

In further aspects, some UEs may each store the plurality of network identifiers associated with its HPLMN and the plurality of cell identifiers associated with cells in its HPLMN in individual databases and then share the stored plurality of network identifiers and/or plurality of cell identifiers with other UEs to update their respective individual databases. For example, a memory (within the UE) may be configured for storing a plurality of network identifiers associated with the UE's Home public land mobile network (HPLMN) and a plurality of cell identifiers associated with cells in the UE's HPLMN.

For example, the one or more databases may be used when the UE is camped onto a cell in a HPLMN near the border. With the databases, the UE has information on available cell identifiers associated with cells in VPLMNs near the border. For example, depending on the call success rate of the cell within the HPLMN near the border, the UE may move to a cell within a VPLMN near the border to continue service using the information in the databases on the available cell identifiers associated with cells in VPLMNs near the border.

In some cases, the UEs may have more information on PLMNs and/or cells within the PLMNs than other UEs. That is, the UEs may have more fingerprinting history than other UEs. Sharing of information (i.e., fingerprinting history) may occur among UEs. In various examples, the sharing may be implemented as a network cloud or common data repository which is accessible by the plurality of UEs to update the individual databases. For example, the sharing may be implemented through device to device (D2D) communications (e.g. LTE-Direct) to update the individual databases. In various examples, the cell identifier of the cell in block 630 may also be stored in the database, even if the cell is not selected as a suitable cell.

Figure 7:
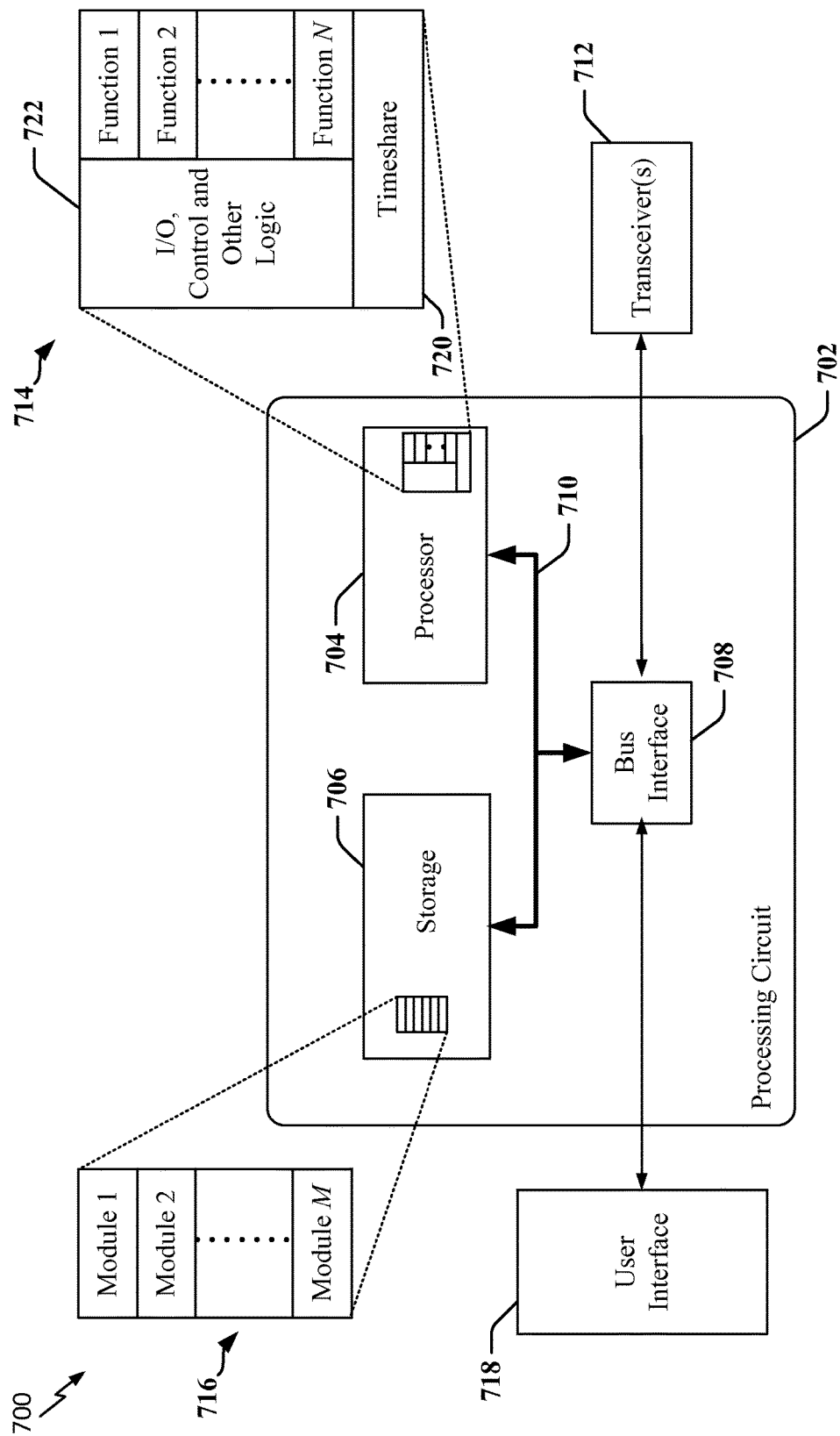
FIG. 7 is a conceptual diagram illustrating a simplified example of a hardware implementation for an apparatus employing a processing circuit 702 that may be configured to perform one or more functions in accordance with aspects of the present disclosure.

FIG. 7 is a conceptual diagram 700 illustrating a simplified example of a hardware implementation for an apparatus employing a processing circuit 702 that may be configured to perform one or more functions in accordance with aspects of the present disclosure. In accordance with various aspects of the disclosure, an element, or any portion of an element, or any combination of elements as disclosed herein may be implemented utilizing the processing circuit 702. The processing circuit 702 may include one or more processors 704 that are controlled by some combination of hardware and software modules. Examples of processors 704 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 704 may include specialized processors that perform specific functions, and that may be configured, augmented or controlled by one of the software modules 716. In various aspects, the software modules 716 may include an egress module, an ingress module and/or a routing module for performing one or more of the features and/or steps in the flow diagram of FIG. 6.

The one or more processors 704 may be configured through a combination of software modules 716 loaded during initialization, and further configured by loading or unloading one or more software modules 716 during operation.

In the illustrated example, the processing circuit 702 may be implemented with a bus architecture, represented generally by the bus 710. The bus 710 may include any number of interconnecting buses and bridges depending on the specific application of the processing circuit 702 and the overall design constraints. The bus 710 links together various circuits including the one or more processors 704, and storage 706. Storage 706 may include memory devices and mass storage devices, and may be referred to herein as computer-readable storage media and/or processor-readable storage media. The bus 710 may also link various other circuits such as timing sources, timers, peripherals, voltage regulators, and power management circuits. A bus interface 708 may provide an interface between the bus 710 and one or more transceivers 712. A transceiver 712 may be provided for each networking technology supported by the processing circuit. In some instances, multiple networking technologies may share some or all of the circuitry or processing modules found in a transceiver 712. Each transceiver 712 provides a means for communicating with various other apparatus over a transmission medium. Depending upon the nature of the apparatus, a user interface 718 (e.g., keypad, display, speaker, microphone, joystick) may also be provided, and may be communicatively coupled to the bus 710 directly or through the bus interface 708.

A processor 704 may be responsible for managing the bus 710 and for general processing that may include the execution of software stored in a computer-readable storage medium that may include the storage 706. In this respect, the processing circuit 702, including the processor 704, may be used to implement any of the methods, functions and techniques disclosed herein. The storage 706 may be used for storing data that is manipulated by the processor 704 when executing software, and the software may be configured to implement any one of the methods disclosed herein.

One or more processors 704 in the processing circuit 702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 706 or in an external computer-readable storage medium. The external computer-readable storage medium and/or storage 706 may include a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium and/or storage 706 may also include, by way of example, a carrier wave, a transmission line, and any other suitable medium for transmitting software and/or instructions that may be accessed and read by a computer. Computer-readable storage medium and/or the storage 706 may reside in the processing circuit 702, in the processor 704, external to the processing circuit 702, or be distributed across multiple entities including the processing circuit 702. The computer-readable storage medium and/or storage 706 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

The storage 706 may maintain software maintained and/or organized in loadable code segments, modules, applications, programs, etc., which may be referred to herein as software modules 716. Each of the software modules 716 may include instructions and data that, when installed or loaded on the processing circuit 702 and executed by the one or more processors 704, contribute to a run-time image 714 that controls the operation of the one or more processors 704. When executed, certain instructions may cause the processing circuit 702 to perform functions in accordance with certain methods, algorithms and processes described herein. In various aspects, each of the functions is mapped to the features and/or steps disclosed in one or more blocks of FIG. 6.

Some of the software modules 716 may be loaded during initialization of the processing circuit 702, and these software modules 716 may configure the processing circuit 702 to enable performance of the various functions disclosed herein. In various aspects, each of the software modules 716 is mapped to the features and/or steps disclosed in one or more blocks of FIG. 6. For example, some software modules 716 may configure input/output (I/O), control and other logic 722 of the processor 704, and may manage access to external devices such as the transceiver 712, the bus interface 708, the user interface 718, timers, mathematical coprocessors, and so on. The software modules 716 may include a control program and/or an operating system that interacts with interrupt handlers and device drivers, and that controls access to various resources provided by the processing circuit 702. The resources may include memory, processing time, access to the transceiver 712, the user interface 718, and so on.

One or more processors 704 of the processing circuit 702 may be multifunctional, whereby some of the software modules 716 are loaded and configured to perform different functions or different instances of the same function. The one or more processors 704 may additionally be adapted to manage background tasks initiated in response to inputs from the user interface 718, the transceiver 712, and device drivers, for example. To support the performance of multiple functions, the one or more processors 704 may be configured to provide a multitasking environment, whereby each of a plurality of functions is implemented as a set of tasks serviced by the one or more processors 704 as needed or desired. In various examples, the multitasking environment may be implemented utilizing a timesharing program 720 that passes control of a processor 704 between different tasks, whereby each task returns control of the one or more processors 704 to the timesharing program 720 upon completion of any outstanding operations and/or in response to an input such as an interrupt. When a task has control of the one or more processors 704, the processing circuit is effectively specialized for the purposes addressed by the function associated with the controlling task. The timesharing program 720 may include an operating system, a main loop that transfers control on a round-robin basis, a function that allocates control of the one or more processors 704 in accordance with a prioritization of the functions, and/or an interrupt driven main loop that responds to external events by providing control of the one or more processors 704 to a handling function. In various aspects, the functions depicted as Function 1 through Function N in the run-time image 714 may include one or more of the features and/or steps disclosed in the flow diagrams of FIG. 6.

In various examples, the methods of flow diagram 600 may be implemented by one or more of the exemplary systems illustrated in FIGS. 1, 2, 3, 5 and 7. In various examples, the methods of flow diagram 600 may be implemented by any other suitable apparatus or means for carrying out the described functions.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-7 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of cell selection comprising:
   determining a gain of an antenna associated with a user equipment (UE);
   adding an offset to a threshold to yield a power threshold, wherein the offset is based on the gain of the antenna;
   selecting a wireless network;
   obtaining a power measurement associated with a cell within the selected wireless network;
   comparing the power measurement with the power threshold to yield a comparison;
   checking a list in a database for a Visitor public land mobile network (VPLMN); and
   triggering a search for one or more roaming public land mobile networks (PLMNs), if the VPLMN is not found on the list.

2. The method of claim 1, further comprising selecting the cell as the suitable cell, wherein the comparison indicates that the power measurement is greater than the power threshold.

3. The method of claim 2, further comprising:
   obtaining a network identifier of the selected wireless network; and
   obtaining a cell identifier of the suitable cell.

4. The method of claim 2, wherein the UE stores a plurality of network identifiers associated with its Home public land mobile network (HPLMN) and stores a plurality of cell identifiers associated with cells in its HPLMN in one or more databases.

5. The method of claim 4 further comprising sharing one or more of the stored plurality of network identifiers and the stored plurality of cell identifiers with another UE.

6. The method of claim 1, further comprising:
   obtaining a power measurement associated with a different cell within the selected wireless network;
   comparing the power measurement associated with the different cell with the power threshold to yield a different comparison; and determining if the different comparison indicates that the power measurement associated with the different cell is greater than the power threshold.

7. The method of claim 1, wherein the wireless network is a public land mobile network (PLMN), being either a Home public land mobile network (HPLMN) or a Visitor public land mobile network (VPLMN).

8. The method of claim 7, wherein the UE is in a border area and approaching the VPLMN.

9. The method of claim 1, further comprising checking if a number of random access channel (RACH) failures equals or exceeds a threshold failure number.

10. The method of claim 1, wherein the search for the one or more roaming PLMNs is triggered after expiration of a VPLMN scan prohibit timer.

11. The method of claim 1, further comprising camping the UE on a Home public land mobile network (HPLMN) and removing the offset that was added to the threshold to yield the power threshold.

12. The method of claim 1, further comprising determining that the UE is in a weak coverage area with no available roaming PLMNs, and removing the offset that was added to the threshold to yield the power threshold.

13. The method of claim 1, further comprising checking if the VPLMN is an operator preferred PLMNs stored in a subscriber identity module (SIM) card of the UE, if the VPLMN is found on the list.

14. The method of claim 1, wherein the selecting the wireless network includes initiating a voice call or a data call using a Radio Resource Control (RRC) connection setup.

15. The method of claim 1, further comprising maintaining a border public land mobile network (PLMN) database with at least one network parameter, wherein the network parameter is one of: a Home public land mobile network (HPLMN) identifiers, a Home public land mobile network (HPLMN) cell identifiers, a Visitor public land mobile network (VPLMN) identifiers, or a Visitor public land mobile network (VPLMN) cell identifiers; and wherein the selecting the wireless network is based on the border PLMN database.

16. An apparatus of cell selection comprising:
a processor for determining a gain of an antenna associated with a user equipment (UE) and for selecting a wireless network;
a receiver coupled to the processor for adding an offset to a threshold to yield a power threshold, wherein the offset is based on the gain of the antenna; and
a power detector coupled to the receiver for obtaining a power measurement associated with a cell within the selected wireless network; and for comparing the power measurement with the power threshold to yield a comparison; and wherein the processor is further configured for checking a list in a database for a Visitor public land mobile network (VPLMN) and for triggering a search for one or more roaming public land mobile networks (PLMNs), if the VPLMN is not found on the list.

17. The apparatus of claim 16, wherein the processor is further configured for selecting the cell as the suitable cell, wherein the comparison indicates that the power measurement is greater than the power threshold.

18. The apparatus of claim 17, wherein the processor is further configured for obtaining a network identifier of the selected wireless network and for obtaining a cell identifier of the suitable cell.

19. The apparatus of claim 17, further comprising a memory coupled to the processor for storing a plurality of network identifiers associated with the UE's Home public land mobile network (HPLMN) and a plurality of cell identifiers associated with cells in the UE's HPLMN.

20. The apparatus of claim 16, wherein the search for the one or more roaming PLMNs is triggered after expiration of a VPLMN scan prohibit timer.

21. An apparatus of cell selection comprising:
means for determining a gain of an antenna associated with a user equipment (UE);
means for adding an offset to a threshold to yield a power threshold, wherein the offset is based on the gain of the antenna;
means for selecting a wireless network;
means for obtaining a power measurement associated with a cell within the selected wireless network;
means for comparing the power measurement with the power threshold to yield a comparison;
means for checking a list in a database for a Visitor public land mobile network (VPLMN); and
means for triggering a search for one or more roaming public land mobile networks (PLMNs), if the VPLMN is not found on the list.

22. The apparatus of claim 21, further comprising means for selecting the cell as the suitable cell, wherein the comparison indicates that the power measurement is greater than the power threshold.

23. The apparatus of claim 22, further comprising:
means for obtaining a network identifier of the selected wireless network; and
means for obtaining a cell identifier of the suitable cell.

24. The apparatus of claim 22, further comprising means for storing a plurality of network identifiers associated with the UE's Home public land mobile network (HPLMN) and a plurality of cell identifiers associated with cells in the UE's HPLMN.

25. The apparatus of claim 21, wherein the search for the one or more roaming PLMNs is triggered after expiration of a VPLMN scan prohibit timer.

26. A non-transitory computer-readable storage medium storing computer executable code, operable on a device comprising at least one processor; a memory for storing one or more of a network identifier or a cell identifier, the memory coupled to the at least one processor; and the computer executable code comprising:
instructions for causing the at least one processor to determine a gain of an antenna associated with a user equipment (UE);
instructions for causing the at least one processor to add an offset to a threshold to yield a power threshold, wherein the offset is based on the gain of the antenna;
instructions for causing the at least one processor to select a wireless network;
instructions for causing the at least one processor to obtain a power measurement associated with a cell within the selected wireless network;
instructions for causing the at least one processor to compare the power measurement with the power threshold to yield a comparison; and
instructions for causing the at least one processor to check a list in a database for a Visitor public land mobile network (VPLMN); and
instructions for causing the at least one processor to trigger a search for one or more roaming public land mobile networks (PLMNs), if the VPLMN is not found on the list.

27. The non-transitory computer-readable storage medium of claim 26, wherein the computer executable code further comprising:
   instructions for causing the at least one processor to select the cell as the suitable cell, wherein the comparison indicates that the power measurement is greater than the power threshold; and
   instructions for causing the at least one processor to obtain one or more of the network identifier or the cell identifier, wherein the network identifier is of the selected wireless network and the cell identifier is of the suitable cell.

28. The non-transitory computer-readable storage medium of claim 26, wherein the search for the one or more roaming PLMNs is triggered after expiration of a VPLMN scan prohibit timer.

* * * * *